US008291860B2

(12) United States Patent
Danneker et al.

(10) Patent No.: US 8,291,860 B2
(45) Date of Patent: Oct. 23, 2012

(54) APPARATUS AND METHOD FOR POSITIONING A TEAT CUP

(75) Inventors: Gert Danneker, Grodinge (SE); Thomas Axelsson, Farsta (SE); Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 120 days.

(21) Appl. No.: 12/739,020

(22) PCT Filed: Nov. 17, 2008

(86) PCT No.: PCT/GB2008/003854
§ 371 (c)(1),
(2), (4) Date: Apr. 21, 2010

(87) PCT Pub. No.: WO2009/063225
PCT Pub. Date: May 22, 2009

(65) Prior Publication Data
US 2010/0300362 A1    Dec. 2, 2010

(30) Foreign Application Priority Data
Nov. 16, 2007    (EP) ..................... 07254500

(51) Int. Cl.
*A01K 1/12*    (2006.01)
*A01J 5/017*   (2006.01)

(52) U.S. Cl. ............... 119/14.04; 119/14.08; 119/14.18; 119/520

(58) Field of Classification Search ............... 119/14.03, 119/14.04, 14.08, 14.18, 14.1, 14.12, 520
See application file for complete search history.

(56) References Cited

U.S. PATENT DOCUMENTS

| 3,095,854 A * | 7/1963 | Bott et al. .................. 119/14.04 |
| 3,789,798 A * | 2/1974 | Reisgies et al. ............ 119/14.08 |
| 4,763,605 A * | 8/1988 | Braum ........................ 119/14.03 |
| 5,718,185 A * | 2/1998 | Pichler et al. .............. 119/14.04 |
| 6,802,280 B2 * | 10/2004 | Mårtensson ............... 119/14.04 |
| 2002/0189547 A1 * | 12/2002 | Eppers et al. ............. 119/14.03 |
| 2008/0202432 A1 * | 8/2008 | Petterson .................. 119/14.03 |
| 2009/0145364 A1 * | 6/2009 | Hardy et al. ............... 119/14.04 |

FOREIGN PATENT DOCUMENTS

| EP | 0 091 892 | 10/1983 |
| EP | 0 689 761 | 1/1996 |
| GB | 1 175 588 | 12/1969 |
| WO | 98/46069 | 10/1998 |
| WO | 00/04766 | 2/2000 |
| WO | 2006/133951 | 12/2006 |

OTHER PUBLICATIONS

International Search Report dated Mar. 3, 2009, from corresponding PCT application.

* cited by examiner

*Primary Examiner* — Rob Swiatek
*Assistant Examiner* — Kathleen Iwasaki
(74) *Attorney, Agent, or Firm* — Young & Thompson

(57) ABSTRACT

An apparatus and method for locating a teat cup for use in a milking parlor. The apparatus includes a milking stall (7) provided on a rotatable platform (9) and a system (19, 245, 23, 25) for controlling movement of a teat cup magazine (20) relative to the stall (7). The movement control system permits movement of the magazine (20) between first and second predefined positions relative to the milking stall (7).

19 Claims, 5 Drawing Sheets

APPARATUS AND METHOD FOR POSITIONING A TEAT CUP

The present invention relates to an apparatus and method for locating a teat cup magazine (i.e. a teat cup holder) relative to a milking stall of a rotary milking parlour.

There are a number of different arrangements of milking parlour known in the dairy industry and one of the arrangements of particular use in handling a large number of animals is the rotary parlour. This type of parlour is provided with a comparatively large number of milking stalls arranged in a circular configuration on a rotating annular platform. The platform rotates at a relatively low constant speed so that a cow may readily step onto the platform from a stationary holding bay and thereby gain access to a stall. The continued rotation of the platform then moves the stall into a position where an operator can perform certain tasks (such as teat cleaning and placement of teat cups on the teats) so as to allow the milking process to begin. The speed of rotation is such that the milking process will have been completed by the time a stall has moved from the cow entry position (where a cow gains entry onto the platform) to a cow exit position (where a cow is permitted to leave the platform). The cow entry and exit points are adjacent one another so as to maximise the time a cow spends in the milking stall.

It will be understood that cows may constantly enter and exit a rotary parlour without stopping the platform rotation and this allows for a large number of cows to be handled. It will be also understood that the movement of the platform results in cows being brought to an operator in turn. The operator is therefore able to remain in one location and concentrate on essential milking tasks without interruptions.

There are two main types of rotary milking parlour system, which will hereinafter be referred to as the Parallel Rotary system and the Herringbone Rotary system.

In a Herringbone Rotary system, a cow stands in a stall facing diagonally towards the outside of an annular rotating platform, in the general direction of rotation. One or more operators stand on the inside of the rotating platform and are thereby provided good access to the side of each cow. Milking equipment is positioned alongside each cow on the inside edge of the platform.

In a Parallel Rotary system, a cow stands in a stall of a rotating platform so as to face radially inward towards the centre of rotation of the platform. Operators stood outside the rotating platform are then able to work from the rear of each cow as the cow passes in turn. Because the cows are positioned side by side, the parallel rotary system allows more cows to be accommodated in the same space. However, due to the close proximity of adjacent cows on the rotating platform, it is impractical to position the milking equipment alongside each cow as in the herringbone rotary system. This is primarily because access by an operator to the milking equipment would be restricted and could possibly cause the animals to become distressed. It is though also important that the position of the milking equipment does not impede a cow's access to the stalls. Accordingly, milking equipment in parallel rotary systems is commonly positioned in a compromise location, at one side of the stall and towards the outside edge of the platform. This position does not overly restrict access to and from the stall, and is also in reasonably close proximity to the udder of the animal to be milked. Nevertheless, because the milking equipment is still positioned at the entrance to a stall, it has been found that problems can still arise when an animal is entering or exiting the stall. Also, because an animal in a parallel rotary system is to be milked from behind, it is necessary for an operator to move the teat cup cluster across the rear of the animal before attachment of the teat cups to the teats. This is a labour intensive exercise in circumstances where large numbers of animals are being milked.

With increased automation of milking systems, teat cup magazines may be provided to assist in retaining teat cups in a known position and thereby allow for a ready selection by, for example, a robot arm. However, especially in the case of parallel rotary systems, the compromise in the positioning of teat cups is still problematic.

It is an object of the present invention to overcome the aforementioned problems.

Described hereinafter is apparatus comprising a rotatable platform, a milking stall provided on said platform, and means for controlling movement of a teat cup magazine; characterised in that the controlling means provides said teat cup magazine with a first predefined position relative to a milking stall and a second predefined position relative to the milking stall, and comprises automated means for moving said teat cup magazine to said positions.

It will be understood that the controlling means of the present invention ensures that a teat cup magazine (i.e. a teat cup holder) may be repeatedly and consistently returned to predefined positions which are particularly desirable for an effective and efficient handling of an animal. Specifically, the predefined positions of the teat cup magazine may be positions which allow an animal to readily gain access to a milking stall and to allow the teat cups to be located about or removed from the teats of the animal.

More specifically, the invention allows a cluster of teat cups to be located in a storage position away from the entrance to a milking stall when access to the stall is required, and for the cluster to be then moved into a more accessible working position once an animal to be milked is received in the stall. In a preferred embodiment, the working position is to the rear of an animal to be milked, and the storage position is alongside the animal. The storage position may, alternatively, be above the animal or to one side of the animal, perhaps mid-way along its length.

In addition to providing predefined positions for a teat cup magazine, the movement controlling means may provide guidance for the teat cup magazine in its movement between said predefined positions. In this respect, movement of the teat cup magazine between said positions may be limited to a specific predefined path. The movement controlling means may also drive the movement, perhaps through use of a cam arrangement connected to a power source.

More particularly, movement of a magazine for a teat cup or a teat cup cluster may be controlled by the position of a rotating milking platform. In this regard, it will be understood that, at the point where a cow steps on to the rotating platform, the teat cup magazine is in its storage position. As the platform rotates towards an operator with the cow located within the milking stall, the teat cup magazine is automatically moved, possibly by said cam arrangement, into a position in which the operator has ready access to the teat cup in the magazine and can easily attach the teat cup to the animal.

The teat cup magazine may be moved according to the position of a gate provided at the back of a stall. After an animal has stepped onto the rotating platform, the gate closes behind the animal to prevent it from backing off the platform until the exit point of the milking parlour is reached, at which point the gate is reopened. The closing and opening of the gate guides the movement of the teat cup magazine. In a particularly preferred embodiment, the teat cup magazine is mechanically connected to the gate, and is moved by the gate between said predefined positions. The gate of each stall may itself be moved by a cam arrangement and this movement of each gate may be powered by means of the rotary movement of the platform.

It will be understood that the teat cup magazine moves between a predefined storage position (a first predefined position) and a predefined working position from which teat cups are attached to the teats of an animal (a second predefined position). However, the teat cup magazine may have more than one distinct working position. Other working positions of the magazine (i.e. intermediate predefined positions) may, for example, be provided for the stage of the process when an animal is being milked and when the teat cups are being removed.

Apparatus according to the present invention may also comprise a robot arm for attaching one or more teat cups to an animal to be milked. Where a robot arm is provided, the robot arm may move the teat cup magazine between said predefined positions.

It will be understood that, through use of a teat cup magazine, a plurality of teat cups (for example, a cluster of four teat cups) may be moved collectively (i.e. simultaneously) between said predefined positions.

Also described hereinafter is a method of locating a teat cup about the teat of an animal, such as a cow, which is stood in a milking stall of a rotary platform, comprising the steps of providing a teat cup magazine with first and second predefined positions relative to said milking stall; automatically moving said magazine from said first position to said second position; removing a teat cup from said magazine and locating said teat cup about the teat of an animal; and returning said teat cup magazine to said first predefined position.

An embodiment of the present invention will now be described with reference to the accompanying drawings, in which.

Figure 1:
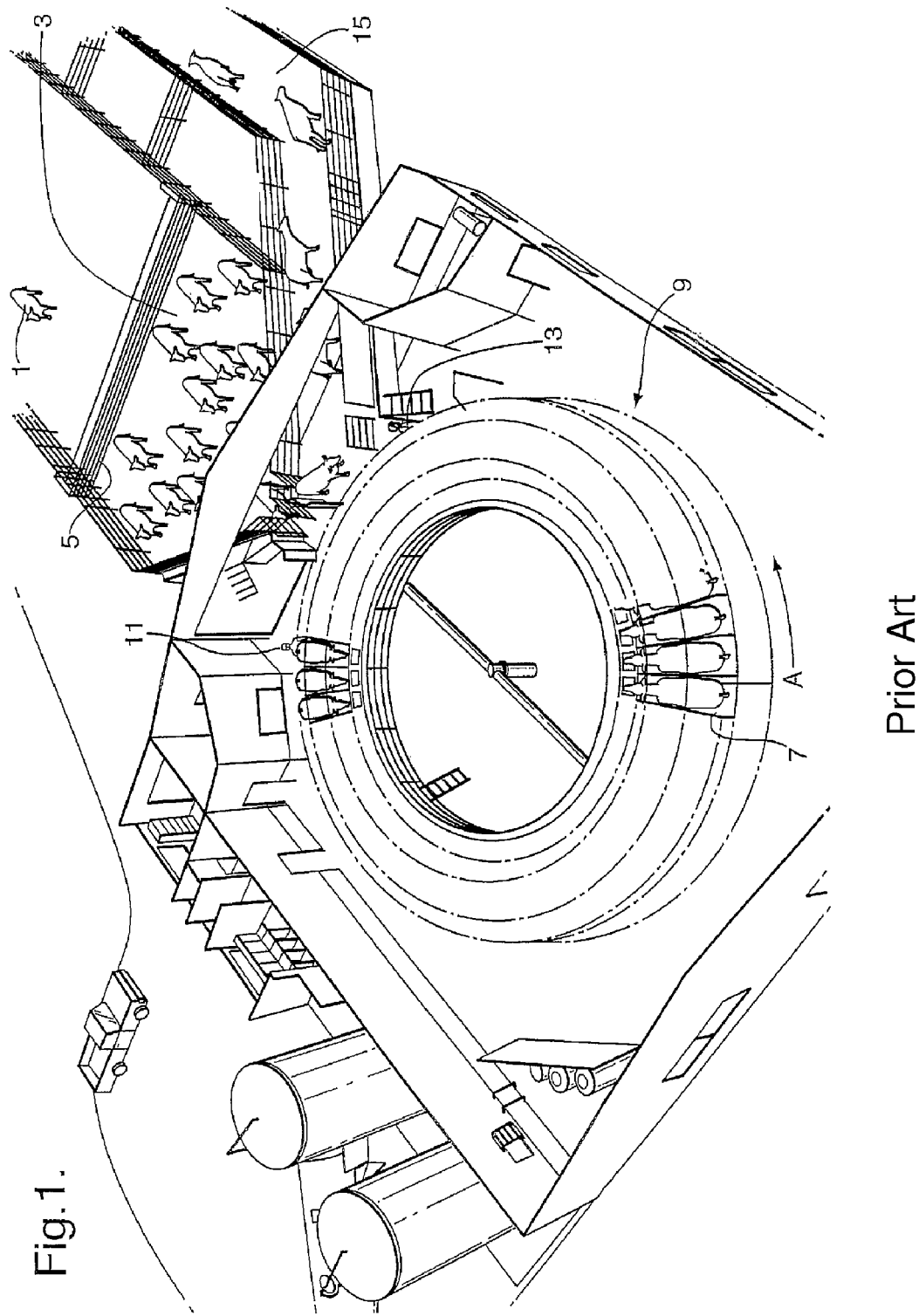
FIG. 1 is a perspective view of a typical prior art Parallel Rotary milking parlour system.

A perspective view of a typical known parallel rotary milking parlour system is shown in FIG. 1. It will be understood that cows 1 are held in a holding area 3 by a crowd gate 5, and are then allowed, one at a time, to enter stalls 7 provided on a rotating platform 9. The rotating platform 9 rotates continuously in an anti-clockwise direction as shown by Arrow A in FIG. 1. It will be understood therefore that each cow 1 enters a vacant stall 7 to the left of the previous cow 1 to have moved onto the rotating platform 9.

The cows 1 on the rotating platform 9 are positioned side-by-side in a radial configuration so that each cow 1 is facing towards the centre of rotation of the rotating platform 9. Once a cow 1 is in position in a stall 7, it is carried by the rotating platform 9 along a circular path to a position adjacent the point where it originally joined the platform 9. In this position, the cow is able to exit the rotating platform 9.

At a location 11 close to the start of the circular path taken by each cow, teat cups are applied to the teats of a cow so as to allow the milking process to begin. This action may be performed by a human operator or by other means such as a robot arm. The milking process then takes place as the cow 1 is transported by the platform 9 along its circular path.

The speed of rotation of the platform 9 is such that the milking process is completed shortly before a full rotation of the platform 9 has been made. Accordingly, when the cow reaches a point 13 towards the end of the rotation, the milking process will have finished and the teat cups may be removed. The teat cup removal may be performed by a human operator or it may be achieved with automated means.

Once the teat cups have been removed from the teats and the cow 1 has completed its rotation on the rotating platform 9, the cow 1 is allowed to back off the rotating platform 9 via an exit point and move away from the rotary milking parlour via a return alley 15.

As can be clearly seen from FIG. 1, cows 1 on the rotating platform 9 are positioned side-by-side in close proximity to one another. In order for the teat cups to be easily accessible, they are positioned in the ends of the stalls 7 toward the outer perimeter of the rotating platform 9. Whilst this allows them to be readily accessible to an operator for attachment to a cow's teats, it does mean that they can, at least partially, restrict a cow's movement when entering or exiting a stall 7.

A parallel rotary system according to the present invention is shown in FIGS. 2 to 5 of the accompanying drawings. The system is similar to that shown in FIG. 1 in terms of the basic configuration, and like elements are referred to herein with like reference numerals. However, the system of FIGS. 2 to 5 differs to that of FIG. 1 in certain respects as will be discussed in greater detail below.

By way of summary in this regard, the parallel rotary system of FIGS. 2 to 5 is provided with overhead cam rails 21, 23 for engaging a roller 25 mounted on a gate 19 associated with each stall 7. Each gate 19 is movable between an open position, in which the gate 19 is removed from the entrance to the stall 7 with which it is associated so as to allow a cow unimpeded access to said stall 7, and a closed position, in which the gate 19 is located adjacent the entrance to said stall 7 so as to prevent a cow from entering or leaving said stall 7.

The mounting of each gate 19 is such as to allow both rotary and linear movement of the gate 19 relative to the associated stall 7. Specifically, the pivotal mounting of each gate 19 may move in a linear direction. In this way, a gate 19 may locate in an open position in which the gate 19 is parallel with a sidewall of the associated stall 7 and is substantially entirely within the perimeter of the stall 7. The arrangement is such that the gate 19 does not extend radially beyond the outer circumferential edge of the rotary platform 9 when in the open position. The ability of the gate 19 to move linearly allows the gate 19 to first move in a plane parallel to the sidewall of the stall 7 and to then rotate into a closed position behind a cow located in the stall 7. The gate mounting arrangement may be such as to allow for a simultaneous rotary and linear movement of the gate 19.

Movement of the gates 19 between the open and closed positions is driven by means of a camming engagement between the cam rails 21, 23 and the rollers 25. A teat cup magazine 20 (schematically shown in FIG. 2) is mounted on each gate 19 for receiving a teat cup cluster (not shown). As such, the movement of a gate 19 between the open and closed positions corresponds to a movement of the associated teat cup magazine between a storage position, in which the magazine (and teat cups received therein) allow unimpeded access to and from the associated stall 7, and a working position, in which the magazine presents the teat cup cluster for ready attachment to the teats of a cow located in said stall 7 (i.e. the stall 7 closed by the gate 19). Although not shown in the accompanying drawings, the cam rails may be arranged so as to provide one or more further positions (intermediate predefined positions). For example, a second working position may be provided for the magazine, which is optimised for receiving teat cups pulled from the teats by an automatic teat cup retraction system. Such a second working position may locate the magazine further from the cow so that the teat cups may swing or be pulled more naturally towards the magazine once removed from the teats. A yet further working position may be provided for the magazine during milking of an animal. This further position ensures that hoses or milking tubes connected to the teat cups are retained in a position which does not interfere with an animal during milking. As mentioned below, the milking tubes may pass through the magazine and this can allow the magazine to readily pull the tubes into a required position free of the animal.

It should be understood that the term teat cup magazine refers to a means for storing or holding one or more teat cups in a particular position and/or orientation. A teat cup magazine may also comprise means for handling (e.g. receiving and guiding) milk tubes connected to teat cups. In such a teat cup magazine, a teat cup may be returned to the magazine from the teat of an animal by pulling on the milk tube, which is then guided along an associated channel of the magazine so that the teat cup attached to the milk tube is returned to the magazine. Since the geometry and general position of the teat cup magazine would be known to an electronic control system of a milking parlour, a robot arm may readily identify the position of a teat cup held within a teat cup magazine.

Figure 2:
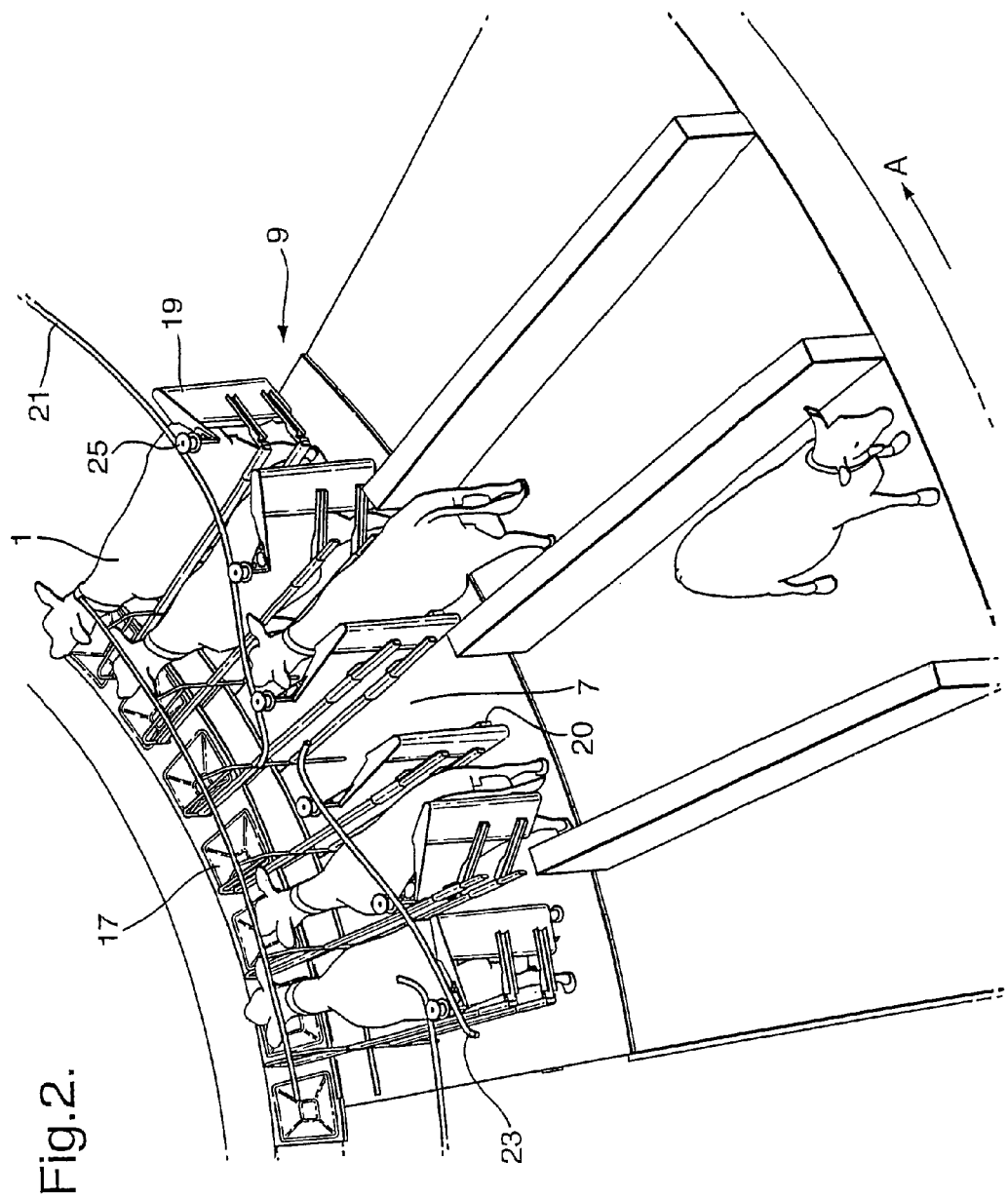
FIG. 2 is a perspective view of animal entry and exit points of the rotating platform of a rotary milking parlour according to the present invention.

By way of a detailed discussion of the system shown FIGS. 2 to 5, a perspective view of entry and exit points to a rotary platform 9 is shown in FIG. 2. A first cam rail 21 interacts with the roller 25 of a gate 19 so that, as the platform 9 rotates, the first cam rail 21 cams the gate 19 into a closed position (also see FIG. 4). The roller 25 then remains in rolling abutment with the rail 21 until almost a full rotation of the platform 9 has been completed. In this way, the connection between the rail 21 and roller 25 retains the gate 19 in a closed position during the rotation of the platform 9. The first rail 21 may therefore be regarded as a "closing rail".

Once the platform rotation has been almost completed and it becomes necessary for the gate 19 to be opened, the arrangement of the rails 21, 23 is such that continued rotation of the platform 9 results in the roller 25 moving into abutment with the second rail 23. The arrangement of the second rail 23 relative to the roller 25 and hinging mechanism of the gate 19 is such that, as the platform 9 further rotates, the second rail 23 cams the gate 19 into an open position (also see FIG. 5). The second rail 23 may therefore be regarded as an "opening rail".

With further reference to FIG. 2, it will be understood that the platform 9 rotates (together with the stalls 7 and the associated gates 19 and rollers 25) in the direction indicated by Arrow A and that the rails 21, 23 remain stationary (i.e. the rails do not move/rotate with the rotary platform 9). Given the direction of rotation, it will be appreciated that each cow 1 is moved to its right after having entered a stall 7.

The closing rail 21 has a first end located to the left of the cow's position of entry onto the rotating platform 9. The location of this first end is also inwards of the platform's outer perimeter edge. From this location, the closing rail 21 extends in the direction of Arrow A towards the outside edge of the rotating platform 9. During use, this section of the closing rail 21 cams the roller 25 of a stall gate 19 so as to move said gate 19 from an open position to a closed position. This section may therefore be considered as the "closing section" of the closing rail 21. After this closing section, the closing rail 21 then follows a part-circular path having a centre of curvature coincident with the axis of rotation of the rotating platform 9. In the particular embodiment illustrated in FIGS. 2 to 5, the part-circular section lies directly overhead the outer circular edge of the rotating platform. The part-circular section terminates at a second end of the closing rail 21 which is located adjacent the position where a cow exits the rotating platform 9. The second end of the closing rail 21 is located radially outward of the first end.

The opening rail 23 is positioned such that a first end thereof is located radially outward of the second end of the closing rail 21 and so as to provide a length of circumferential overlap of the two rails 21, 23. The opening rail 23 then extends to a second distal end thereof along a substantially straight path passing across the point at which a cow exits a stall and leaves the rotating platform 9. The second end of the opening rail 23 is located radially inward of the first end of said rail 23 and radially inward of the part-circular section of the closing rail 23. The location of the second end of the opening rail 23 is also adjacent the start of the closing rail 21 (i.e. adjacent the first end of the opening rail 23). More specifically, the second end of the opening rail 23 is located radially outward of the first end of the closing rail 21.

The arrangement of the opening rail 23 relative to the closing rail 21 is such that, at the end of a full rotary cycle of a stall 7, engagement of a roller 25 with the opening rail 23 will have moved the gate 19 associated with said stall 7 into its fully opened position. In this open position, the gate 19 is withdrawn into the stall 7 (so as not to project radially outward any further than when in its closed position) and is located parallel along a sidewall of the stall 7. A cow 1 can then leave the stall 7 via a return alley 15 without being impeded by the gate 19 or the teat cup magazine 20. As the platform continues to rotate in the direction of Arrow A, the vacated stall 7 becomes accessible to further cows located in the holding area 3.

As the platform 9 rotates to a position where a further cow 1 may gain access to a stall 7, the roller 25 associated with the gate 19 of that stall 7 moves from being in rolling abutment with a radially inner edge or side surface of the opening rail 23 to being in rolling abutment with a radially outer edge or side surface of the closing rail 21. As the platform 9 further rotates in the direction of Arrow A, the roller 25 is guided along the aforementioned closing section of the closing rail 21 and the gate 19 and, therefore, the associated teat cup magazine 20, is first moved towards the outside edge of the rotating platform (the gate 19 remaining parallel with the sidewall of the stall 7) and is then moved so as to rotate into a closed position behind the cow 1. This closing movement of the gate 19 simultaneously places the teat cup magazine 20 in a predefined working position at the rear of the cow 1 (for example, directly under the udders). This position provides for ready access to the teat cups and convenient attachment of these cups to the teats.

With a cow 1 retained in a stall 7 by a gate 19 and with the teat cup magazine in a suitable working position at the rear of the cow 1, the teat cups are applied to the teats and the milking process can then take place throughout the majority of a complete rotation of the platform 9. A feed trough 17 is provided in each stall 7 so that a cow may eat during the milking process.

The gate 19 is retained in its closed position during the milking process by a continuing engagement of the roller 25 with the radially outer edge of the part-circular section of the closing rail 21. It will be understood that a roller 25 remains in rolling abutment with the part-circular section for the majority of a stall's rotary cycle.

Towards the end of a stall's rotary cycle, the teat cups are removed from the teats and returned to the teat cup magazine 20. This action is completed while the teat cup magazine remains in a working position. In embodiments of the present invention wherein a second predefined working position is provided for the magazine as being more suitable for receiving automatically retracted teat cups, the teat cups will clearly not be retracted until the magazine has been moved to this second working position.

Figure 3:
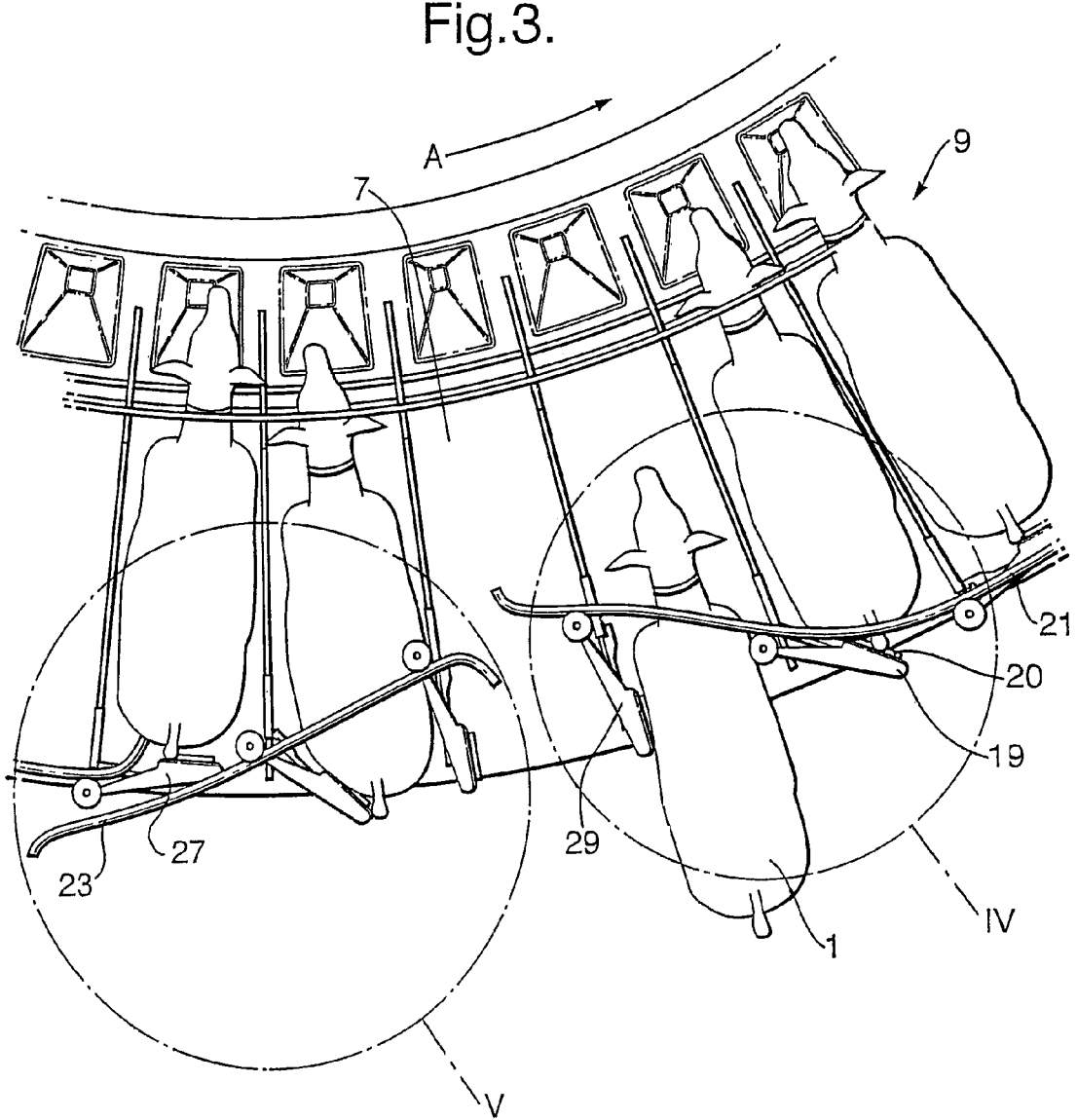
FIG. 3 is a plan view of a portion of the rotating platform shown in FIG. 2.

A plan view of the rotating platform 9 at the cow entry and exit points is shown in FIG. 3. The closing rail 21 and opening rail 23 are clearly visible. A cow 1 is shown entering a vacant stall 7 (see circled area IV in FIG. 3), and a stall gate 29 to the left of this cow 1 (i.e. the cow shown joining the rotating platform 9) is shown in an open position. This corresponds to a storage position of the teat cup magazine 20. The associated roller 25 is located near the beginning of the closing rail 21 and will roll along the closing rail 21 so as to close the gate 29 as the platform 9 further rotates in the direction of Arrow A.

In the far left-hand side of FIG. 3 (see circled area V in FIG. 3), a further cow 1 is shown stood on the rotating platform 9 in a closed stall 7. This cow 1 is approaching the end of its rotation on the rotating platform 9. A stall gate 27 is closed behind the cow 1 and this ensures that the teat cup magazine 20 remains in a convenient position under the cow 1 (i.e. in a working position). The associated gate roller 25 is shown approaching the end of the closing rail 21 and is located in the overlap between the closing rail 21 and the opening rail 23. As the platform 9 continues to rotate in the direction of Arrow A, it will be understood that the roller 25 will reach the end of the closing rail 21 and be guided inwards by the opening rail 23 so as to open the gate 27 and return the teat cup magazine 20 to its storage position 29.

Figure 4:
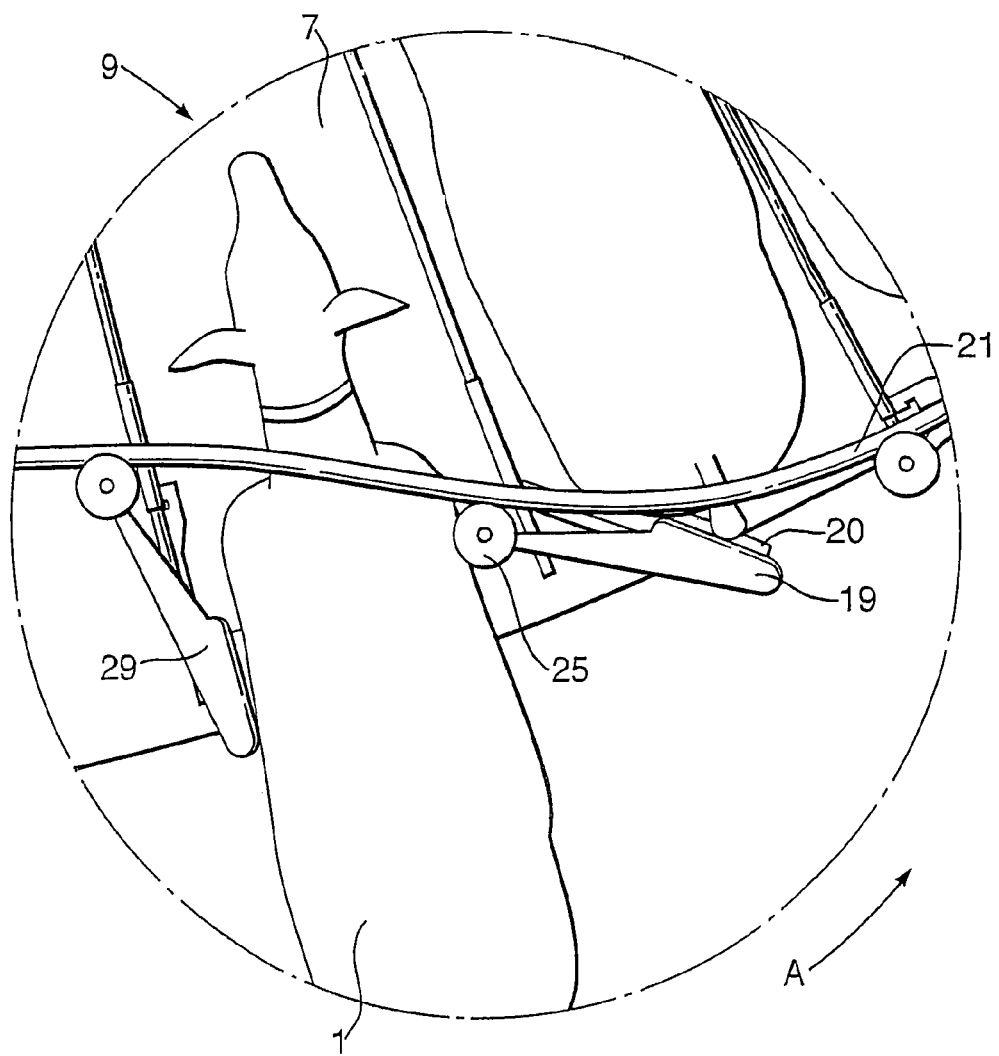
FIG. 4 is an enlarged view of the area marked IV in FIG. 3.

A large-scale plan view of the aforementioned cow 1 joining the rotating platform 9 in the circled area IV (of FIG. 3) is shown in FIG. 4. The cow 1 is shown having entered half way into an empty stall 7 with the associated gate 29 open and the teat cup magazine 20 in its storage position to the side of the stall 7, providing the cow 1 with unimpeded access to the rotating platform 9. The closing section of the closing rail 21 is shown with the rollers 25 of two gates 19, 29 being guided therealong and the roller 25 of a third gate 19 shown being guided by the part-circular section of the closing rail 21.

Figure 5:
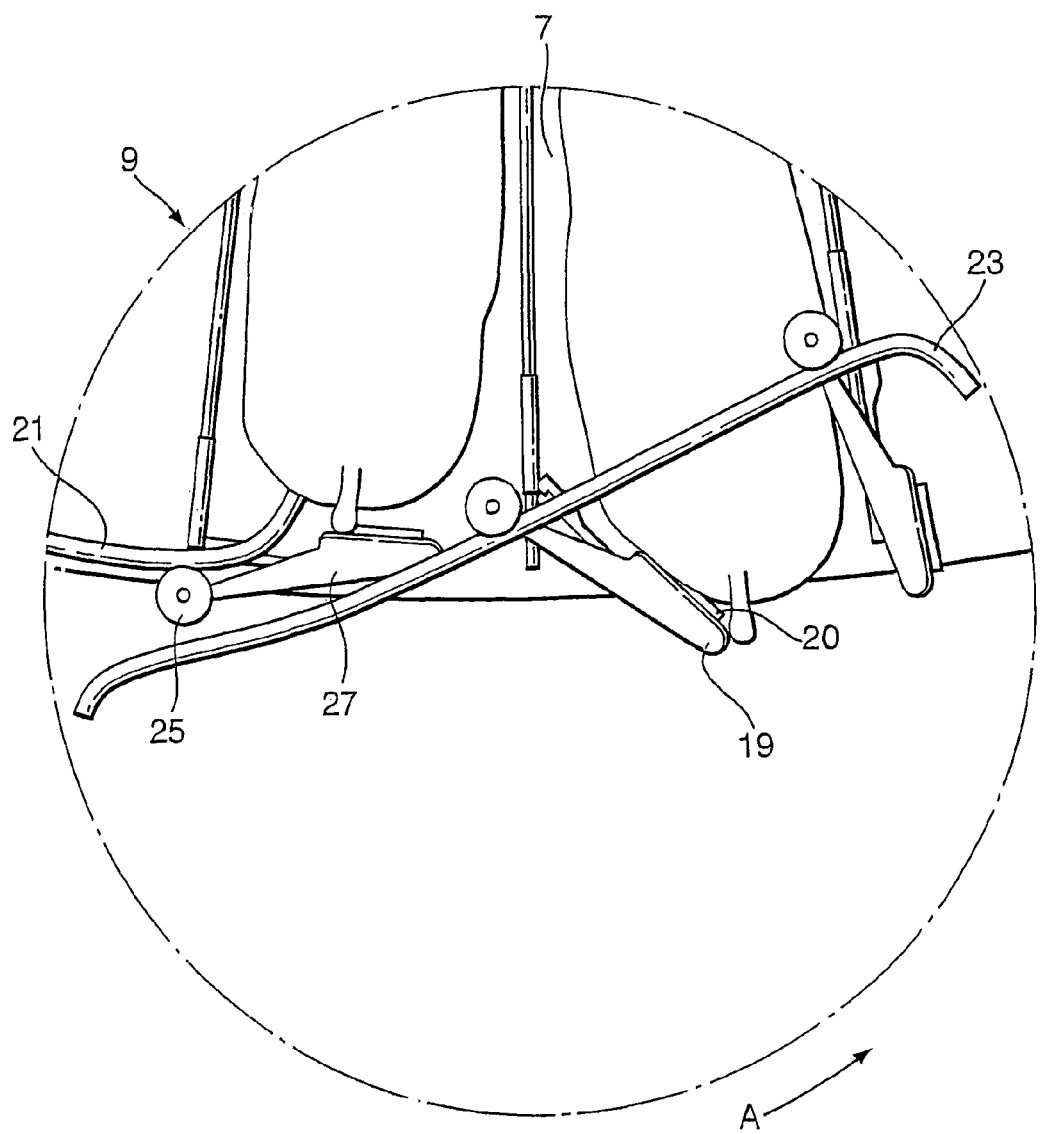
FIG. 5 is an enlarged view of the area marked V in FIG. 3.

A large-scale plan view of the aforementioned cow 1 at the end of its rotation in the circled area V (of FIG. 3) is shown in FIG. 5. The associated gate 27 is closed behind the cow 1, and the teat cup magazine 20 is located in its working position. The roller 25 of the gate 27 is shown approaching the end of the closing rail 21 and is positioned between the closing rail 21 and the opening rail 23. Rollers 25 from two further gates 19 are shown being guided along the inside of opening rail 23.

The system described above provides a particularly simple and efficient way of moving a teat cup magazine 20 between a storage position 29, in which the magazine 20 does not obstruct access to a stall 7, and a working position 27, in which teat cups held in the magazine 20 may be readily accessed and applied to the teats of a cow 1 located in the stall 7. The system allows for a reliable, repeatable and optimal positioning of a teat cup magazine 20 at all stages of the milking process.

The present invention is not limited to the specific embodiment described above. Alternative arrangements will be apparent to a reader skilled in the art. For example, the teat cup magazine need not be associated with a gate.

In addition, the teat cup magazine may be moved between its predefined positions by a variety of means including an automatic electronic manipulation device (for example, a robot arm) or other controllable electronics. In a particularly preferred embodiment, the electronic control circuitry of a robot arm ensures the robot arm has moved the magazine to a predefined position by the time the stall has been moved to a particular rotary position. The path taken by the robot arm in moving the magazine is not necessarily the same every time, but the magazine is in the required predefined position every time the stall locates in an associated predefined rotary position. The robot arm is therefore able to move freely between predefined positions, which allows for obstacle avoidance. Accordingly, when the magazine is not in one of the predefined positions, it could be located in a position, which is not dependent on the rotary position of the stall.

Whilst this latter feature is particularly characteristic of a system having a magazine moved by an automatic electronic manipulation device, a mechanical system may also allow movement of the magazine independently of the stall position for certain positions (or range of positions) of the stall within its rotary cycle. The camming system described herein has this characteristic in respect of the camming actions driven by the opening rail 23 and the closing section of the closing rail 21. In this regard, when the magazine is being moved towards the open position by the opening rail 23, or, towards the closed position by the closing section of the closing rail 21, this movement may be hastened manually by an operator. In other words, when a gate is being closed by the closing rail, an operator may choose to manually close the gate more rapidly. Such an overriding of the camming system may be prevented with the addition of further cam rails acting on the relevant roller 25 to prevent said movement independently of the rotary position of the stall. Such an overriding of the camming system may be resisted, although not necessarily prevented, with the addition of biasing means (for example, springs) for pressing the relevant roller 25 on to the opening and/or closing rails to resist said movement independently of the rotary position of the stall (as defined by said rails). When the gate is in the fully open or closed position, it is be pressed against stops (not shown) by the camming rails and is thereby prevented from moving. Cam rails may perform the role of the stops.

Furthermore, when the robot arm is not moving the magazine, it may perform other tasks as necessary. Also, the teat cups may be used for washing the teats of an animal or for milking the animal.

The invention claimed is:

1. An apparatus, comprising:
a rotatable platform with milking stalls provided on said platform, the platform being a parallel rotary system platform configured for cows to stand in the stalls generally parallel to each other and so as to face radially inward towards a center of rotation of the platform;
each said milking stall having a perimeter with a front, a rear and two opposing sides between said front and said rear, the rear providing an entrance and an exit to each said stall;
a teat cup magazine provided for each said milking stall, each teat cup magazine movable between a first predefined teat cup storage position and a second predefined teat cup working position; and
a movement control system provided with each said milking stall, the movement control system controlling movement of said teat cup magazine relative to said stall between the first predefined teat cup storage position and the second predefined teat cup working position,
said movement control system comprising automated parts moving said teat cup magazine i) to said first predefined teat cup storage position upon rotation of said platform between a first position and a second position, said first predefined position corresponding to a position of the teat cup magazine allowing a cow unimpeded access to and from the stall, and ii) to said second predefined teat cup working position upon rotation of said platform between a third position and a fourth position, said second predefined position corresponding to a position of the teat cup magazine prohibiting the cow unimpeded access to and from the stall.

2. The apparatus according to claim 1, wherein said first predefined position is the teat cup storage position with said teat cup magazine located at the perimeter of said stall.

3. The apparatus according to claim 1, wherein said first predefined position is the teat cup storage position with said teat cup magazine located so as to allow an animal using said stall to walk into and from said stall with unimpeded access to said stall.

4. The apparatus according to claim 1, wherein said second predefined position is the teat cup working position with said teat cup magazine located at the rear of the milking stall so as to be adjacent the udder of a cow standing in said stall prohibiting the cow unimpeded access to and from the stall.

5. The apparatus according to claim 4, wherein the teat cup working position is located so said teat cup magazine is substantially under the udder of said cow prohibiting said cow unimpeded access to and from the stall.

6. The apparatus according to claim 1, wherein said automated parts comprise a camming arrangement for driving movement of the teat cup magazine between said predefined positions.

7. The apparatus according to claim 6, wherein said camming arrangement comprises a cam, relative to which the platform rotates, and a cam follower mounted on the platform so as to move relative to the cam and in abutment therewith when the platform rotates.

8. The apparatus according to claim 7, wherein,
said cam comprises a rail arranged to abut said cam follower so as to drive movement of the teat cup magazine from said first predefined position to said second predefined position in response to rotation of the platform,
said rail is arranged to abut said cam follower so as to retain the teat cup magazine in said second predefined position during a subsequent rotary movement of the platform, and
said cam comprises a return rail arranged to abut said cam follower so as to drive movement of the teat cup magazine from said second predefined position to said first predefined position in response to further rotation of the platform.

9. The apparatus according to claim 1, wherein said automated parts comprises a robot arm.

10. The apparatus according to claim 1, wherein the movement control system ensures that a position of said teat cup magazine, relative to said stall, is dependent upon certain positions of said stall within a rotary cycle of said platform and is independent upon other positions of said stall within the rotary cycle of said platform.

11. The apparatus according to claim 1, further comprising a gate, wherein,
said automated parts move said teat cup magazine i) to said first predefined teat cup storage position upon rotation of said platform between the first position and the second position during opening of said gate, and ii) to said second predefined teat cup working position upon rotation of said platform between the third position and the fourth position during closing of said gate.

12. The apparatus according to claim 11, wherein said first predefined position corresponds to an open position of the gate allowing a cow unimpeded access to and from the stall via the entrance of the stall.

13. The apparatus according to claim 12, wherein said second predefined position is the teat cup attachment working position with said teat cup magazine located at the rear of the milking stall so as to be adjacent the udder of a cow standing in said stall, said second predefined position corresponding to a closed position of the gate.

14. The apparatus according to claim 11, wherein said second predefined position is the teat cup working position with said teat cup magazine located at the rear of the milking stall so as to be adjacent the udder of a cow standing in said stall.

15. The apparatus according to claim 1, wherein,
the rear of the perimeter of each said milking stall comprises a gate, and
the gate, under control of said movement control system, is movable between i) an open position allowing a cow access to said stall, and ii) a closed position preventing the cow from entering or leaving said stall.

16. The apparatus of claim 15, wherein,
the movement control system comprises i) a roller mounted on said gate, and ii) at least one rail positioned to interact with said roller upon rotation of said platform for moving said teat cup magazine between the storage and working positions,
said at least one rail comprises a first, closing cam rail and a second, opening cam rail, and
the movement control system moving said teat cup magazine to i) the first, closing cam rail positioned to interact with said roller upon rotation of said platform, the interaction of said closing cam rail with said roller causing said gate to move into the closed position and to move said teat cup magazine into the working position, and ii) the second, opening cam rail positioned to interact with said roller upon another rotation of said platform, the interaction of said opening move rail with said roller causing said gate to cam into the open position and to move said teat cup magazine into the storage position.

17. The apparatus according to claim 15, wherein said teat cup magazine is mounted on the gate.

18. The apparatus according to claim 15, wherein, said teat cup magazine is mounted on said gate and said movement control system moves said teat cup magazine and said gate as one with movement of the gate between the open and closed positions corresponding to movement of the teat cup magazine between the storage position and the working position.

19. The apparatus according to claim 15, wherein said second predefined position is the teat cup working position with said teat cup magazine located at the rear of the milking stall so as to be adjacent the udder of a cow standing in said stall, said second predefined position corresponding to the closed position of the gate.

* * * * *